United States Patent
Shi et al.

(10) Patent No.: US 12,468,016 B2
(45) Date of Patent: Nov. 11, 2025

(54) DISPLAY DEVICE AND MANUFACTURING METHOD THEREOF

(71) Applicants: Chengdu BOE Optoelectronics Technology Co., Ltd., Sichuan (CN); BOE Technology Group Co., Ltd., Beijing (CN)

(72) Inventors: Bo Shi, Beijing (CN); Weiyun Huang, Beijing (CN); Chi Yu, Beijing (CN); Yue Long, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 147 days.

(21) Appl. No.: 17/611,867

(22) PCT Filed: Dec. 18, 2020

(86) PCT No.: PCT/CN2020/137658
§ 371 (c)(1),
(2) Date: Nov. 16, 2021

(87) PCT Pub. No.: WO2022/126615
PCT Pub. Date: Jun. 23, 2022

(65) Prior Publication Data
US 2023/0305114 A1   Sep. 28, 2023

(51) Int. Cl.
*G01S 7/481* (2006.01)
*G01S 17/10* (2020.01)
*G01S 17/86* (2020.01)

(52) U.S. Cl.
CPC ............ *G01S 7/4816* (2013.01); *G01S 17/10* (2013.01); *G01S 17/86* (2020.01)

(58) Field of Classification Search
CPC ...... G01S 7/4865; G01S 17/88; G01S 17/894; G02B 27/0172; G02B 27/0018; G02B 1/11; G02B 5/28
(Continued)

(56) References Cited

U.S. PATENT DOCUMENTS 5,135,877 A * 8/1992 Albergo ................. H10H 20/84
  257/98
6,686,049 B1 * 2/2004 Nakamura ............ C03C 17/008
  359/359
(Continued)

FOREIGN PATENT DOCUMENTS

CN   102458821 A   5/2012
CN   205539555 U   8/2016
(Continued)

OTHER PUBLICATIONS

CN 202080003422.8 first office action dated Jun. 25, 2025.

*Primary Examiner* — Bumsuk Won
*Assistant Examiner* — Seth D Moser
(74) *Attorney, Agent, or Firm* — IPro, PLLC (57) ABSTRACT

The present disclosure provides a display device and a manufacturing method thereof. The display device includes a display panel and a TOF sensor arranged at a side of the display panel away from a display surface. Detection light received by the TOF sensor is allowed to pass through a target light-transmitting region of the display panel. A light reflection interference layer is arranged on a surface of the target light-transmitting region facing the TOF sensor, and configured to adjust a transmission direction of reflected light between the display panel and a lens of the TOF sensor.

18 Claims, 4 Drawing Sheets

(58) Field of Classification Search
USPC .............................. 359/586, 603, 609, 613
See application file for complete search history.

(56) References Cited

U.S. PATENT DOCUMENTS

| | | | | |
|---|---|---|---|---|
| 10,488,520 | B2* | 11/2019 | Boufounos | ........... G01S 7/4865 |
| 2009/0128798 | A1* | 5/2009 | Danziger | .............. G01S 7/4818 |
| | | | | 356/5.01 |
| 2009/0135151 | A1* | 5/2009 | Sun | ........................ G06F 3/041 |
| | | | | 345/173 |
| 2011/0227873 | A1 | 9/2011 | Chung et al. | |
| 2012/0064297 | A1* | 3/2012 | Honda | ..................... G02B 5/02 |
| | | | | 252/582 |
| 2015/0370390 | A1 | 12/2015 | Takahashi et al. | |
| 2019/0382883 | A1* | 12/2019 | Ouyang | .............. H01J 37/3417 |
| 2020/0036936 | A1* | 1/2020 | Scaggs | .................... H04N 5/72 |
| 2020/0117877 | A1 | 4/2020 | Xie | |
| 2021/0258498 | A1* | 8/2021 | Gove | ........................ G06N 3/08 |
| 2022/0357437 | A1* | 11/2022 | Tsai | ....................... G01S 7/4863 |
| 2023/0221421 | A1* | 7/2023 | Piggott | ................. G01S 7/4816 |
| | | | | 356/5.09 |
| 2024/0345230 | A1* | 10/2024 | Zhang | .................. G01S 7/4814 |

FOREIGN PATENT DOCUMENTS

| | | |
|---|---|---|
| CN | 108288679 A | 7/2018 |
| CN | 210606372 U | 5/2020 |
| CN | 111223912 A | 6/2020 |
| CN | 111490081 A | 8/2020 |
| CN | 211319243 U | 8/2020 |
| CN | 211529178 U | 9/2020 |
| CN | 111999935 A | 11/2020 |
| IN | 210895487 U | 6/2020 |
| JP | 2014102356 A | 6/2014 |

* cited by examiner

DISPLAY DEVICE AND MANUFACTURING METHOD THEREOF

CROSS-REFERENCE TO RELATED APPLICATION

The present application is the U.S. national phase of PCT Application No. PCT/CN2020/137658 filed on Dec. 18, 2020, which is incorporated herein by reference in its entirety.

TECHNICAL FIELD

The present disclosure relates to the field of display technology, in particular to a display device and a manufacturing method thereof.

BACKGROUND

In order to meet the market demand, as a current trend, a front camera is hidden directly under a display screen, so as to provide a full-screen display effect, and realize perfect combination of full-screen display and photographing.

Face recognition technology has also become a basic function of a current display device. The face recognition technology includes 3D structured light, a Time Of Flight (TOF) ranging method, etc. As compared with the 3D structured light, the TOF ranging method has such advantages as long detection distance, simple structure, and a small occupied space for reducing a screen-to-body ratio, so it has been widely used in a full-screen display device.

However, in the display device with a TOF ranging structure, because an air gap layer with a thin center and a thick edge is formed between a lens and a display panel on a light transmitter of the TOF ranging structure, after light from the light transmitter is reflected and refracted by the lens and the display panel, the reflected light at both sides of the air gap layer forms coherent light. A difference between optical paths of the two light beams is related to a thickness of the air gap layer at the position. Along with a change in the thickness of the air gap layer, dark stripes occur at a place where destructive interference is generated and bright stripes occur at a place where constructive interference is generated, so such a phenomenon as Newton ring will occur. At this time, the TOF imaging accuracy is adversely affected.

SUMMARY

An object of the present disclosure is to provide a display device and a manufacturing method thereof, so as to solve the problem in the related art where the imaging accuracy is adversely affected due to the occurrence of a Newton ring for a facial image generated by a display device with a TOF ranging structure.

In one aspect, the present disclosure provides a display device, including a display panel and a TOF sensor arranged at a side of the display panel away from a display surface. Detection light received by the TOF sensor is allowed to pass through a target light-transmitting region of the display panel. A light reflection interference layer is arranged on a surface of the target light-transmitting region facing the TOF sensor, and configured to adjust a transmission direction of reflected light between the display panel and a lens of the TOF sensor.

In a possible embodiment of the present disclosure, the light reflection interference layer is configured to allow the reflected light to pass therethrough directly.

In a possible embodiment of the present disclosure, the light reflection interference layer is configured to scatter the reflected light.

In a possible embodiment of the present disclosure, a transparent substrate is arranged at a side of the display panel away from the display surface, the light reflection interference layer is arranged on the transparent substrate, and a second refractive index $n2$ of the light reflection interference layer is smaller than a first refractive index $n1$ of the transparent substrate.

In a possible embodiment of the present disclosure, the first refractive index $n1$ and the second refractive index $n2$ meet the equation $n2=(n1*n)^{(1/2)}$, where n is a refractive index of air.

In a possible embodiment of the present disclosure, the light reflection interference layer has a thickness equal to $1/5$ to $2/5$ of a wavelength of the detection light.

In a possible embodiment of the present disclosure, the light reflection interference layer is made of $MgF_2$ or $SiO_2$.

In a possible embodiment of the present disclosure, the light reflection interference layer is a layer having a rough surface.

In a possible embodiment of the present disclosure, the light reflection interference layer covers an entire surface of the display panel away from the display surface.

In a possible embodiment of the present disclosure, pixel units are arranged on the target light-transmitting region, and the pixel units arranged on the target light-transmitting region and the pixel units arranged on the other display region meet at least one of the followings: each pixel unit on other display region includes a light-emitting unit and a driving circuitry laminated one on another, and each pixel unit on the target light-transmitting region merely includes a light-emitting unit; or a distribution density of the pixel units on the target light-transmitting region is less than a distribution density of the pixel units on other display region; or an area occupied by each pixel unit on the target light-transmitting region is smaller than an area occupied by each pixel unit on other display region.

In a possible embodiment of the present disclosure, the display device further includes a camera arranged at a side of the display panel away from the display surface, and an orthogonal projection of the camera onto the display panel is located within the target light-transmitting region.

The present disclosure further provides in some embodiments a method for manufacturing the above-mentioned display device, including: forming a display panel; forming a light reflection interference layer on a surface of the target light-transmitting region of the display panel away from the display surface; and forming the TOF sensor at a side of the display panel away from the display surface. Detection light received by the TOF sensor is allowed to pass through the target light-transmitting region of the display panel.

In a possible embodiment of the present disclosure, when the light reflection interference layer is made of $MgF_2$ or $SiO_2$, the light reflection interference layer is formed through vacuum plating or plasma-enhanced chemical vapor deposition.

In a possible embodiment of the present disclosure, when the light reflection interference layer is a layer with a rough surface, the light reflection interference layer is formed through surface atomization or the attachment of an anti-glare scattering film.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
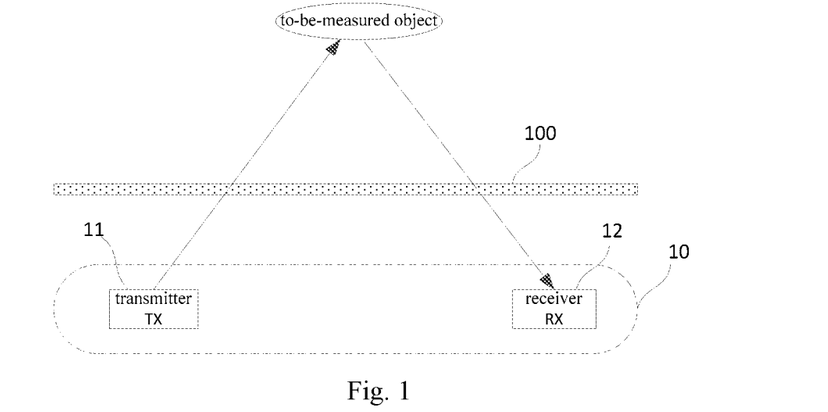
FIG. 1 is a schematic view showing a working principle of a TOF sensor.

The present disclosure provides in some embodiments a display device which includes a TOF sensor for face recognition and/or image collection. To be specific, as shown in FIG. 1, the TOF sensor 10 includes a transmitter TX 11 and a receiver RX 12. The transmitter 11 is configured to emit modulated detection light, and the receiver 12 is configured to receive the detection light. Based on a time-of-flight of the detection light, it is able to measure a distance D between a to-be-measured object and the TOF sensor, thereby to obtain a three-dimensional profile of the to-be-measured object.

In a possible embodiment of the present disclosure, the detection light may be, but not limited to, infrared light having a wavelength of 940 nm.

When applied to a display device, as shown in FIG. 1, the TOF sensor 10 is arranged at one side of a display panel 100. The detection light emitted by the transmitter TX 11 passes through the display panel 100 to the to-be-measured object at the other side of the display panel 100, is reflected by the to-be-measured object, and then passes through the display panel 100 to the receiver RX 12. In order to realize face recognition or image collection, synchronization needs to be maintained between the transmitter TX 11 and the receiver RX 12, and the receiver RX 12 is capable of detecting a transmission time of the detection light from the transmitter TX 11. Based on this, a processor of the display device is capable of analyzing and obtaining the three-dimensional profile of the to-be-measured object within a preset distance from the display panel 100 in accordance with the transmission time detected by the receiver RX 12.

Figure 2:
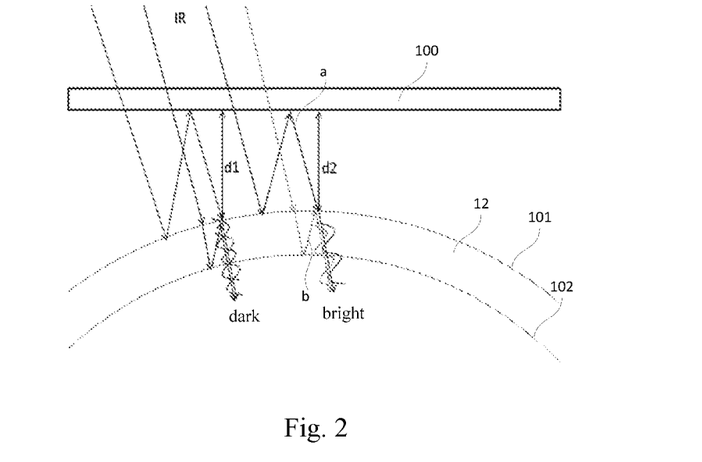
FIG. 2 is a schematic view showing a principle of the generation of a Newton ring by the TOF sensor.

In the display device with the TOF sensor 10, generally a lens of the receiver RX 12 has a curved surface, so as shown in FIG. 2, an air gap layer with a thin center and a thick edge is formed between the receiver RX 12 and the display panel 100. After light is reflected and refracted by the lens of the receiver RX 12 and the display panel 100, the reflected light entering an interior of the lens forms coherent light. Along with a change in the thickness of the air gap layer, dark stripes occur at a place where destructive interference is generated, and bright stripes occur at a place where constructive interference is generated, namely, such a phenomenon as Newton ring occurs. At this time, the TOF imaging accuracy is adversely affected.

In order to solve the above-mentioned problem, the present disclosure provides in some embodiments a display device. Through a light reflection interference layer arranged on a surface of the display panel away from a display surface, it is able to adjust a transmission direction of the reflected light between the display panel and the lens of the TOF sensor 10, so as to prevent the occurrence of the Newton ring when the coherent light is received by the TOF sensor 10.

Figure 3:
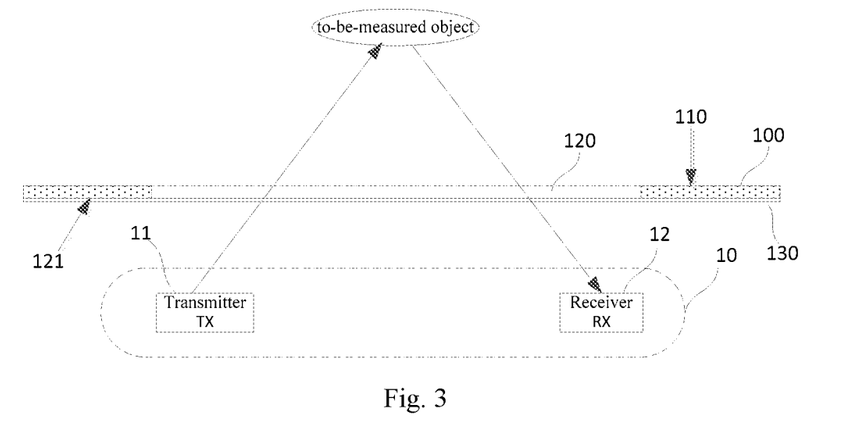
FIG. 3 is a sectional view of a display device according to one embodiment of the present disclosure.
Figure 4:
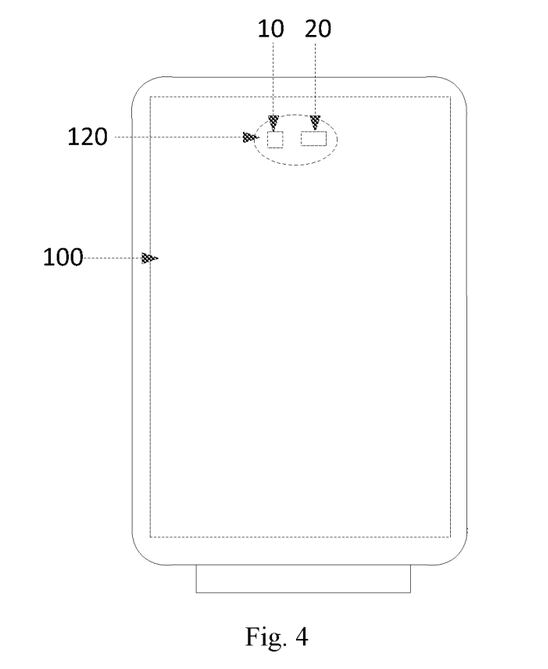
FIG. 4 is a planar view of the display device according to one embodiment of the present disclosure.

To be specific, as shown in FIG. 3 and FIG. 4, the display device includes a display panel 100 and a TOF sensor 10 arranged at a side of the display panel 100 away from a display surface 110. Detection light received by the TOF sensor 10 is allowed to pass through a target light-transmitting region 120 of the display panel 100. A light reflection interference layer 130 is arranged on the surface 121 of the target light-transmitting region 120 of the display panel 100 facing the TOF sensor 10.

The light reflection interference layer 130 is configured to adjust the transmission direction of the detection light between the display panel 100 and the lens of the TOF sensor 10, so as to ensure that reflectivity of the light reflected by the light reflection interference layer 130 is within a preset range, thereby to ensure that the light received by the TOF sensor is not coherent light.

It should be appreciated that, the light reflection interference layer 130 serves to the interference light generated due to the reflected detection light between the display panel 100 and the lens of the TOF sensor 10, and accordingly, the reflectivity of the reflected light received by the TOF sensor 10 is reduced in case that the interference light is reduced. The preset range is a numerical range of the reflectivity of the detected light under the condition that the light received by the TOF sensor 10 does not include the interference light and no Newton ring is generated. The specific range may be obtained through experiments. In a possible embodiment of the present disclosure, the reflectivity of incident light entering the light reflection interference layer 130 may be detected by a reflectance testing tool, and the reflectivity is a ratio of an intensity of the reflected light to an intensity of the incident light. Experiment results show that, under the condition that the light received by the TOF sensor is not coherent light, the reflectivity of the light reflected by the light reflection interference layer 130 should be less than or equal to 1%, that is, the preset range is greater than zero and less than or equal to 1%.

As shown in FIG. 2 and FIG. 3, in the display device with the TOF sensor 10, the detection light from the transmitter of the TOF sensor 10 is reflected by the to-be-measured object, passes through the target light-transmitting region 120 of the display panel 100, and then reaches the receiver RX 12 of the TOF sensor 10. When the detection light reflected by the to-be-measured object is transmitted to the receiver RX 12 of the TOF sensor 10, a part of the detection light is reflected between the display panel 100 and a first lens 101 of the TOF sensor 10 to form first reflected light a. The first reflected light a passes the first lens 101 and a second lens 102 of the TOF sensor 10 sequentially, and then reaches the receiver of the TOF sensor 10. In addition, a part of the detection light is reflected between the first lens 101 and the second lens 102 of the TOF sensor 10 to form second reflected light b. The second reflected light b passes through the second lens 102, and reaches the receiver of the TOF sensor 10. Due to the air gap layer with a thin center and a thick edge between the display panel 100 and the first lens 101 of the TOF sensor 10, when no light reflection interference layer 130 is arranged on a surface 121 of the target light-transmitting region 120 facing the TOF sensor 10, the first reflected light a and the second reflected light b form coherent light, and a difference between optical paths of the two light beams is related to the thickness of the air gap layer at the position. Along with a change in the thickness of the air gap layer, dark stripes occur at a place where destructive interference is generated and bright stripes occur at a place where constructive interference is generated, i.e., such a phenomenon as Newton ring will occur.

Based on the above-mentioned reason for the generation of the Newton ring, in a possible embodiment of the present disclosure, the light reflection interference layer 130 is formed as an anti-reflection film layer for allowing the reflected light to directly pass therethrough.

Figure 5:
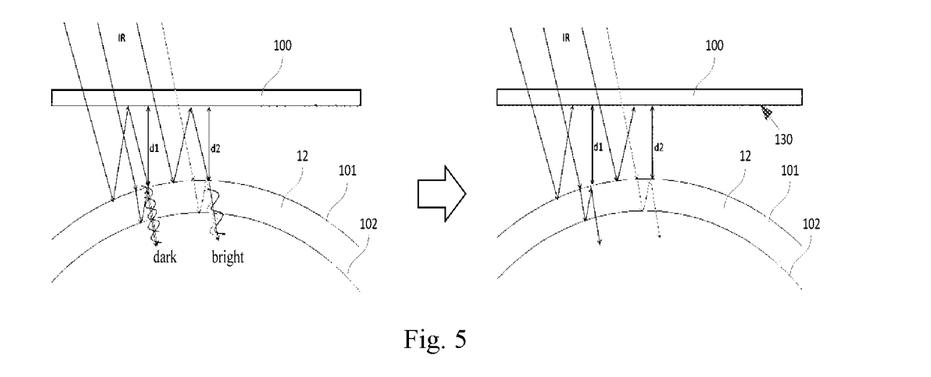
FIG. 5 is a schematic view showing the comparison between light transmission for the display device according to one embodiment of the present disclosure and light transmission in the related art.

To be specific, through the light reflection interference layer 130, i.e., the anti-reflection film layer, on the surface 121 of the target light-transmitting region 120 facing the TOF sensor 10, it is able to achieve the destructive interference for the reflected light entering the light reflection interference layer 130 due to equal inclination interference between film layers, thereby to achieve an anti-reflection effect, as shown in FIG. 5.

A transparent substrate is arranged at a side of the display panel 100 away from the display surface 110, and the light reflection interference layer 130 is arranged on the transparent substrate. The light reflection interference layer 130 has a second refractive index n2 smaller than a first refractive index n1 of the transparent substrate.

In the embodiments of the present disclosure, when the second refractive index n2 of the light reflection interference layer 130 is smaller than the first refractive index n1 of the transparent substrate, it is able to achieve the destructive interference for the reflected light entering the light reflection interference layer 130, thereby to achieve the anti-reflection effect.

Based on a principle of a single-layered antireflection film, when a refractive index of an optical film layer on a glass substrate is less than that of the glass substrate and a reflection ratio of the optical film layer is less than that of the glass substrate, it is able to achieve the anti-reflection effect.

To be specific, the first refractive index n1 and the second refractive index n2 meet the equation $n2=(n1*n)^{(1/2)}$, where n is a refractive index of air.

In other words, when the first refractive index n1 and the second refractive index n2 meet the above-mentioned equation, the reflection ratio of the glass substrate of the light reflection interference layer 130 is set to be zero, so as to achieve a totally anti-reflection effect.

In a possible embodiment of the present disclosure, a thickness of the light reflection interference layer 130 is between 1/5 and 2/5 of a wavelength of the detection light.

In a possible embodiment of the present disclosure, the thickness of the light reflection interference layer 130 is 1/4 of the wavelength of the detection light. In this way, when the light is reflected and transmitted inside the glass substrate on which the light reflection interference layer 130 is provided, an optical path of the reflected light is shifted by half the wavelength, so as to achieve the destructive interference.

In a possible embodiment of the present disclosure, the detection light from the TOF sensor 10 is infrared light having a wavelength of 940 nm, so the light reflection interference layer 130 may have a thickness of 235 nm.

For example, when the first refractive index n1 of the glass substrate is 1.945 and the refractive index n of air is 1.00027, based on the above-mentioned equation, in the case that the second refractive index n2 of the light reflection interference layer 130 is 1.395 and, more optionally, the thickness of the light reflection interference layer 130 is 235 nm, it is able to achieve an optimum anti-reflection effect, thereby to significantly reduce the equal thickness interference and eliminate the Newton ring.

In a possible embodiment of the present disclosure, in the case that the first refractive index n1 of the glass substrate is 1.945 and the detection light from the TOF sensor 10 is infrared light, the light reflection interference layer 130 is made of $MgF_2$ having a refractive index of 1.374. As compared with the other material, the refractive index of $MgF_2$ is closer to the second refractive index n2 calculated using the above equation, i.e. 1.395, so it is able to achieve the anti-reflection effect to the greatest extent.

In the embodiments of the present disclosure, when the light reflection interference layer 130 is made of $MgF_2$, the light reflection interference layer 130 may be formed on the glass substrate of the display panel 100 facing the TOF sensor 10 through vacuum plating.

In another possible embodiment of the present disclosure, the light reflection interference layer 130 is made of $SiO_2$, and when the detection light emitted by the TOF sensor 10 is infrared light, the thickness of the light reflection interference layer 130 is 235 nm. When the detection light from the TOF sensor 10 is infrared light, a refractive index of $SiO_2$ is 1.452. In the case that the first refractive index n1 of the glass substrate with the light reflection interference layer 130 is 1.945, the refractive index of the light reflection interference layer 130 is also relatively close to the second refractive index n2 calculated using the above-mentioned equation, namely, 1.395. In this way, it is able to achieve he destructive interference to a great extent, and reduce the reflection of the infrared light, thereby to prevent the occurrence of the Newton ring.

In the embodiments of the present disclosure, when the light reflection interference layer 130 is made of $SiO_2$, the light reflection interference layer 130 may be formed on the glass substrate of the display substrate 100 of the display panel 100 facing the TOF sensor 10 through plasma-enhanced chemical vapor deposition (PECVD).

Figure 6:
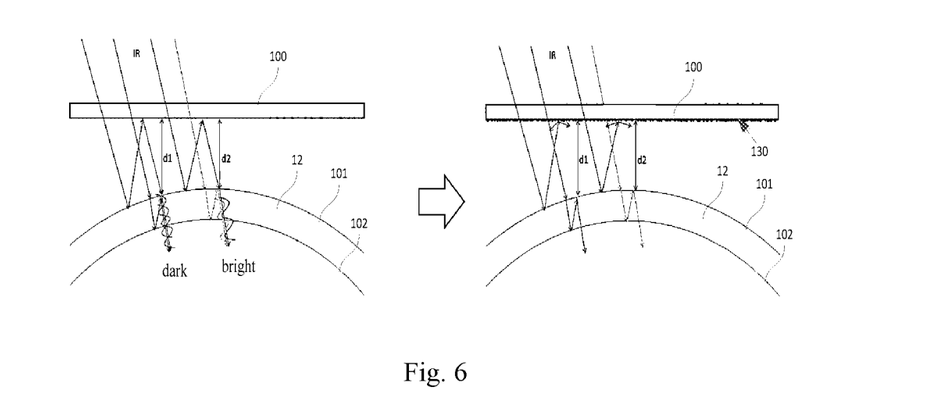
FIG. 6 is another schematic view showing the comparison between light transmission for the display device according to one embodiment of the present disclosure and light transmission in the related art.

In yet another possible embodiment of the present disclosure, the light reflection interference layer 130 may also be used to adjust the transmission direction of the detection light between the display panel 100 and the lens of the TOF sensor 10 through scattering the received light, as shown in FIG. 6, so that the light received by the TOF sensor 10 is not coherent light.

To be specific, in the embodiments of the present disclosure, the light reflection interference layer 130 is formed as a layer with a rough surface including a plurality of concaves and convexes. In this way, it is able to scatter the incident light, i.e., to form diffuse reflection.

To be specific, the layer with the rough surface, i.e., the light reflection interference layer 130, is formed on the glass substrate of the display panel 100 facing the TOF sensor 10 through atomization.

In a possible embodiment of the present disclosure, the light reflection interference layer 130 is merely formed in the target light transmission region 120 on the glass substrate of the display panel 100 facing the TOF sensor 10, as long as the light reflection interference layer may adjust the transmission direction of the detection light between the display panel 100 and the lens of the TOF sensor 10 to eliminate or relieve the equal thickness interference on a surface of the lens and prevent the occurrence of the Newton ring.

In a possible embodiment of the present disclosure, in order to simplify the manufacture process, the light reflection interference layer 130 covers the entire surface of the display panel 100 away from the display surface, i.e. the light reflection interference layer 130 is formed on the entire surface of the glass substrate of the display panel 100 facing the TOF sensor 10.

In a possible embodiment of the present disclosure, as shown in FIG. 4, pixel units are arranged on the target light-transmitting region 120 to form a light-transmitting display region.

In a possible embodiment of the present disclosure, as shown in FIG. 4, the display device further include a camera 20 arranged at a side of the display panel 100 away from the display surface. An orthogonal projection of the camera 20 onto the display panel 100 is located within the target light-transmitting region 120.

Based on the above, it is able to provide the display device with a full-screen display effect, and enable the TOF sensor 10 to collect the detection light for forming the three-dimensional profile of the to-be-measured object through a part of the display region (namely, the target light-transmitting region) for face recognition and/or image collection.

In a possible embodiment of the present disclosure, the camera 20 is also arranged directly below the target light-transmitting region, so as to collect image information.

In a possible embodiment of the present disclosure, as shown in FIG. 4, the target light-transmitting region 120 of the display panel 100 is formed as a first display region, and the display panel 100 further includes a second display region surrounding the target light-transmitting region 120. The first display region and the second display region together form the entire display region of the display panel 100.

In a possible embodiment of the present disclosure, the target light-transmitting region 120 is arranged near an upper edge of the display panel 100.

In addition, in order to enable the target light-transmitting region 120 to achieve a display effect, the display panel 100 may be an OLED display panel, and the pixel unit on the target light-transmitting region 120 is made of a light-transmitting material.

In order to ensure a light-transmitting function of the target light-transmitting region 120, the pixel unit on the target light-transmitting region 120 (namely, the first display region) may be different from the pixel unit on a normal display region (namely, the second display region) other than the target light-transmitting region 120. Each pixel unit on the second display region includes a light-emitting unit and a driving circuitry laminated one on another, and each pixel unit on the first display region merely includes a light-emitting unit; or a distribution density of the pixel units on the first display region is less than a distribution density of the pixel units on the second display region; or an area occupied by each pixel unit on the first display region is smaller than an area occupied by each pixel unit on the second display region.

For example, in a possible embodiment of the present disclosure, each pixel unit on the second display region includes an OLED light-emitting unit and a driving circuitry laminated one on another. Each pixel unit on the first display region merely includes an OLED light-emitting unit and does not include a driving circuitry for the OLED light-emitting unit, and the driving circuitry is arranged at an edge region of the display panel 100 and connected to a corresponding OLED light-emitting unit via a connection line.

In another possible embodiment of the present disclosure, each of the pixel units on the first display region and the pixel units on the second display region includes an OLED light-emitting unit and a driving circuitry, but the distribution density of the pixel units on the first display region, namely, the target light-transmitting region 120, is less than the distribution density of the pixel units on the second display region.

In yet another possible embodiment of the present disclosure, each of the pixel units on the first display region and the pixel units on the second display region includes an OLED light-emitting unit and a driving circuitry, and the distribution density of the pixel units on the first display region, namely, the target light-transmitting region 120, is equal to the distribution density of the pixel units on the second display region. However, an area occupied by each pixel unit on the first display region is smaller than an area occupied by each pixel unit on the second display region.

According to the embodiments of the present disclosure, in a full-screen display device with the TOF sensor, the light reflection interference layer is arranged on a surface of the display panel away from the display surface. Through the light reflection interference layer, it is able to adjust the transmission direction of the light between the display panel and the lens of the TOF sensor, and eliminate or relieve the equal thickness interference on the surface of the surface, thereby to prevent the occurrence of the Newton ring.

Figure 7:
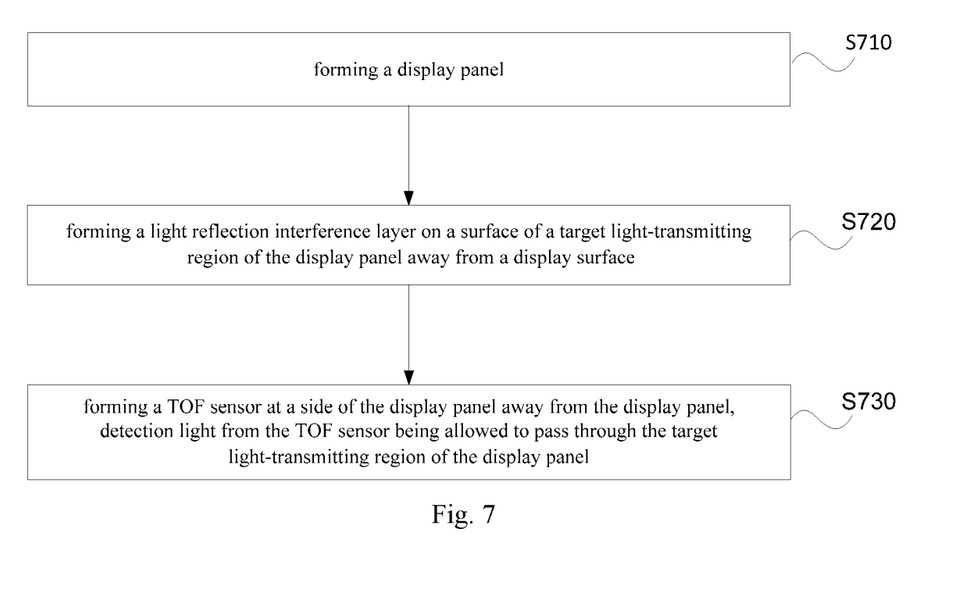
FIG. 7 is a flow chart of a method for manufacturing the display device according to one embodiment of the present disclosure.

The present disclosure further provides in some embodiments a method for manufacturing the above-mentioned display device which, as shown in FIG. 7 in conjunction with FIG. 1 to FIG. 6, includes: S710 of forming the display panel; S720 of forming the light reflection interference layer on a surface of the target light-transmitting region of the display panel away from the display surface; and S730 of forming the TOF sensor at a side of the display panel away from the display surface. Detection light from the TOF sensor is allowed to pass through the target light-transmitting region of the display panel.

According to the method in the embodiments of the present disclosure, in the manufactured display device, through the light reflection interference layer, it is able to adjust the transmission direction of the light between the display panel and the lens of the TOF sensor, and eliminate or relieve the equal thickness interference on the surface of the surface, thereby to prevent the occurrence of the Newton ring.

In a possible embodiment of the present disclosure, when the light reflection interference layer is made of $MgF_2$ or $SiO_2$, the light reflection interference layer is formed through vacuum plating or plasma-enhanced chemical vapor deposition.

In a possible embodiment of the present disclosure, when the light reflection interference layer is a layer with a rough surface, the light reflection interference layer is forming through surface atomization or the attachment of an anti-glare scattering film.

With reference to FIG. 1 to FIG. 6, a specific process of the method is known to those skilled in the art, which will not be particularly defined herein.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display device, comprising a display panel and a time-of-flight (TOF) sensor arranged at a side of the display panel away from a display surface, wherein detection light received by the TOF sensor is allowed to pass through a target light-transmitting region of the display panel, wherein a light reflection interference layer is arranged on a surface of the target light-transmitting region facing the TOF sensor, and configured to adjust a transmission direction of reflected light between the display panel and a lens of the TOF sensor, and configured to ensure that reflectivity of the light reflected by the light reflection interference layer is within a preset range and ensure that the light received by the TOF sensor is not coherent light, wherein the preset range is greater than zero and less than or equal to 1%.

2. The display device according to claim 1, wherein the light reflection interference layer is configured to allow the reflected light to pass therethrough directly.

3. The display device according to claim 2, wherein a transparent substrate is arranged at a side of the display panel away from the display surface, the light reflection interference layer is arranged on the transparent substrate, and a second refractive index n2 of the light reflection interference layer is smaller than a first refractive index n1 of the transparent substrate.

4. The display device according to claim 3, wherein the first refractive index n1 and the second refractive index n2 meet the equation $n2=(n1*n)^{(1/2)}$, where n is a refractive index of air.

5. The display device according to claim 4, wherein the light reflection interference layer has a thickness equal to $\frac{1}{5}$ to $\frac{2}{5}$ of a wavelength of the detection light.

6. The display device according to claim 4, wherein the light reflection interference layer is made of $MgF_2$ or $SiO_2$.

7. The display device according to claim 3, wherein the light reflection interference layer has a thickness equal to $\frac{1}{5}$ to $\frac{2}{5}$ of a wavelength of the detection light.

8. The display device according to claim 3, wherein the light reflection interference layer is made of $MgF_2$ or $SiO_2$.

9. The display device according to claim 2, wherein the light reflection interference layer has a thickness equal to $\frac{1}{5}$ to $\frac{2}{5}$ of a wavelength of the detection light.

10. The display device according to claim 2, wherein the light reflection interference layer is made of $MgF_2$ or $SiO_2$.

11. The display device according to claim 1, wherein the light reflection interference layer is configured to scatter the reflected light.

12. The display device according to claim 11, wherein the light reflection interference layer is a layer having a rough surface.

13. The display device according to claim 1, wherein the light reflection interference layer covers an entire surface of the display panel away from the display surface.

14. The display device according to claim 1, wherein pixel units are arranged on the target light-transmitting region, and the pixel units arranged on the target light-transmitting region and the pixel units arranged on the other display region meet at least one of the followings: each pixel unit on other display region comprises a light-emitting unit and a driving circuitry laminated one on another, and each pixel unit on the target light-transmitting region merely comprises a light-emitting unit; or a distribution density of the pixel units on the target light-transmitting region is less than a distribution density of the pixel units on other display region; or an area occupied by each pixel unit on the target light-transmitting region is smaller than an area occupied by each pixel unit on other display region.

15. The display device according to claim 1, further comprising a camera arranged at a side of the display panel away from the display surface, wherein an orthogonal projection of the camera onto the display panel is located within the target light-transmitting region.

16. A method for manufacturing the display device according to claim 1, comprising:
   forming a display panel;
   forming a light reflection interference layer on a surface of the target light-transmitting region of the display panel away from the display surface; and
   forming the TOF sensor at a side of the display panel away from the display surface,
   wherein detection light received by the TOF sensor is allowed to pass through the target light-transmitting region of the display panel.

17. The method according to claim 16, wherein when the light reflection interference layer is made of $MgF_2$ or $SiO_2$, the light reflection interference layer is formed through vacuum plating or plasma-enhanced chemical vapor deposition.

18. The method according to claim 16, wherein when the light reflection interference layer is a layer with a rough surface, the light reflection interference layer is formed through surface atomization or the attachment of an anti-glare scattering film.

* * * * *